United States Patent [19]

Sato

[11] Patent Number: 5,661,606
[45] Date of Patent: Aug. 26, 1997

[54] ZOOM LENS WITH HIGH ZOOM RATIO AND INCLUDING TWO LENS UNITS

[75] Inventor: Haruo Sato, Saitama-ken, Japan

[73] Assignee: Nikon Corporation, Tokyo, Japan

[21] Appl. No.: 592,637

[22] Filed: Jan. 26, 1996

[30] Foreign Application Priority Data

Jan. 27, 1995 [JP] Japan ................................. 7-031546

[51] Int. Cl.$^6$ .............................. G02B 15/14; G02B 3/02
[52] U.S. Cl. ........................ 359/691; 359/682; 359/708
[58] Field of Search ................................. 359/691, 689,
359/686, 682, 681, 708

[56] References Cited

U.S. PATENT DOCUMENTS

| 5,329,402 | 7/1994 | Sato | 359/691 |
| 5,381,268 | 1/1995 | Sato | 359/691 |
| 5,452,134 | 9/1995 | Sato | 359/682 |

FOREIGN PATENT DOCUMENTS

| 62-94812 | 5/1987 | Japan . |
| 4-114115 | 4/1992 | Japan . |
| 4-242709 | 8/1992 | Japan . |
| 4-251211 | 9/1992 | Japan . |
| 5-249376 | 9/1993 | Japan . |

OTHER PUBLICATIONS

English–language abstract of JP 62-94812. May 1987.
English–language abstract of JP 4-114115. Apr. 1992.
English–language abstract of JP 4-242709. Aug. 1992.
English–language abstract of JP 4-251211. Sep. 1992.

Primary Examiner—Georgia Y. Epps
Assistant Examiner—Jordan M. Schwartz
Attorney, Agent, or Firm—Oliff & Berridge

[57] ABSTRACT

An inexpensive, compact and relatively easy-to-manufacture zoom lens is composed of a small number of lenses which can be mass produced favorably. The zoom lens includes a negative lens unit and a positive lens unit wherein the first lens unit includes, in order from the object side, a first negative meniscus lens component having a concave surface with stronger curvature facing the image side, a second negative meniscus lens component having a concave surface with stronger curvature facing the image side, and a third positive lens component having a convex surface with stronger curvature facing the object side. The second lens unit includes, in order from the object side, a fourth positive lens component, a fifth positive lens component, a sixth negative lens component, and a seventh positive lens component. At least one of the lens surfaces of the first negative meniscus lens component in the first lens group and the second negative meniscus lens component is aspheric. Additionally, the zoom lens satisfies the following conditions:

$$0.6 \leq |f1|/(fw \times ft)^{1/2} < 1.0$$

$$1.2 \leq XII/fw \leq 2.0$$

$$0.02 \leq d56/dII \leq 0.18.$$

20 Claims, 8 Drawing Sheets

ZOOM LENS WITH HIGH ZOOM RATIO AND INCLUDING TWO LENS UNITS

BACKGROUND OF THE INVENTION

1. Field of the Invention

The present invention relates to zoom lenses, in particular, compact standard zoom lenses with high zoom ratios.

2. Description of Related Art

In recent years, a zoom lens with a zoom ratio of 2.5 that includes the standard field angle (hereafter standard zoom lens) having, in order from the object side, a lens unit with negative refractive power and a lens unit with positive refraction power has essentially replaced the standard fixed focal length lens (a lens with about 50 mm focal length on a 35 mm camera) as the standard camera lens.

Because a standard zoom lens as described above is mounted on the camera body as the regularly used lens, miniaturizing the zoom lens becomes as important as high performance and inexpensive manufacture.

Although a zoom lens with two lens units with negative and positive refractive powers as explained above is common, other arrangements have been proposed.

For example, a compact two unit zoom lens having a total of seven lenses with the first lens unit having negative, negative and positive refractive power lenses, and the second lens unit having positive, positive, negative, and positive refractive power lenses is proposed in Japanese Laid-Open Patent Publication Sho 62-94812.

Moreover, in Japanese Laid-Open Patent Publication Hei 5-249376 of the present inventor, a two unit zoom lens with the first lens unit having only a negative lens and a positive lens is proposed.

A zoom lens disclosed in Japanese Laid-Open Patent Publication Sho 62-94812 above is compact, consisting of a small number of lenses. However, the zoom ratio is small at 2.2 to 2.3, and there is a need to increase the zoom ratio in order to develop standard zoom lenses of the future.

The zoom lens disclosed in Japanese Laid-Open Patent Publication Hei 4-114115 has a higher zoom ratio of 2.7. However, with an increase in the zoom ratio, the position of an aspheric lens surface is moved from the object side to the image side and an aspheric lens surface is used in the lens closest to the image side in the first lens unit. As a result, the degrees of freedom for correction of coma at the telephoto side and spherical aberration that increases with increased zoom ratio are increased. On the other hand, compared to a zoom lens using an aspheric surface for the object side lens in the first lens unit, the image correction performance for coma at the maximum wide-angle state, astigmatism, and distortion are decreased, resulting in deterioration of imaging performance at the maximum wide-angle state.

As explained above, Japanese Laid-Open Patent Publication Hei 5-249376 discloses a zoom lens with the number of lenses in the first lens unit being reduced by one lens to a negative lens and a positive lens. The zoom lens disclosed in Japanese Laid-Open Patent Publication Hei 5-249376 realizes a high zoom ratio and high performance by minimizing the length of the first lens unit. However, by making the first lens unit a two lens structure, the refractive power of the negative lens in the first lens unit became relatively strong, tending to cause the aspheric amount (the difference between a paraxial reference spherical lens surface and the aspheric lens surface in the direction of the optical axis) to become relatively large.

Hence, it is difficult to manufacture the above-stated negative lens using current manufacturing methods such as producing a compound type aspheric lens with the glass direct press method. Thus, not only do production costs rise, but also with the compound type aspheric lens, it is difficult to accept increased aberrations caused by moisture absorption and temperature changes in the synthetic resin lens components, even if production is possible.

SUMMARY OF THE INVENTION

In view of the problems noted above, an object of the invention is to provide an inexpensive compact zoom lens with a small number of lenses, having a high zoom ratio, that is relatively easy to manufacture, and that is easy to produce in large quantities.

In order to resolve the above noted problems, the invention provides a zoom lens including, in order from the object side, a first lens unit of negative refractive power and a second lens unit of positive refractive power, wherein zooming is performed by changing the spacing between the first lens unit and the second lens unit. The first lens unit includes, in order from the object side, a first negative meniscus lens component having a concave surface with a stronger curvature and facing the image side, a second negative meniscus lens component having a concave surface with a stronger curvature and facing the image side, and a third positive lens component. The second lens unit includes, in order from the object side, a fourth positive lens component, a fifth positive lens component, a sixth negative lens component, and a seventh positive lens component. At least one of the lens surfaces of the first negative meniscus lens component or the second negative meniscus lens component is aspheric, and satisfies the following conditions:

$$0.6 \leq |fI|/(fw \times ft)^{1/2} < 1.0 \quad (1)$$

$$1.2 \leq XII/fw \leq 2.0 \quad (2)$$

$$0.02 \leq d56/dII \leq 0.18 \quad (3)$$

where fI=focal length of the first lens unit, fw=focal length of the entire zoom lens at a maximum wide-angle state, ft=focal length of the entire zoom lens at a maximum telephoto state, XII=maximum movement amount of the second lens unit during zooming, d56=Spacing along the optical axis between the fifth lens component, that is positive, and the sixth lens component, that is negative, dII=total length of the second lens unit along the optical axis.

Here, total length of the second lens unit along the optical axis refers to the distance between the lens surface closest to the object side and the lens surface closest to the image side along the optical axis in the second lens unit. Moreover, the sign of the maximum movement amount XII associated with zooming of the second lens unit is defined to be positive if the movement is toward the object.

As will be explained later with regard to an equation (a), the condition (1) is related to the change of the total length of the zoom lens for the zooming operation. If the value of condition (1) exceeds 1.0, that implies that the total length of the zoom lens system at the maximum wide-angle state becomes a maximum while if the value of equation (1) does not reach 1.0, that implies that the total length of the lens system at the maximum telephoto state becomes a maximum.

Hence, if the upper limit of condition (1) is exceeded, the total length of the lens system at the maximum wide-angle state becomes the longest. Therefore, the incidence height of oblique light rays at the maximum wide-angle state become extremely high, causing a need to increase the diameter of the frontmost lens and a lack of brightness at the edge of the image field which is undesirable. Moreover, the amount of displacement during focusing increases, reducing the brightness at the edge of the image field during extremely short distance shooting and increasing the incident height of the chief light ray, which produces a so-called eclipse of the chief light ray due to the displacement during focusing, making further shortening very difficult.

The performance of the zoom lens of the invention can be enhanced by making the upper limit of the condition (1) no more than 0.996, enabling further miniaturization, reducing the diameters of lens components and increasing the brightness at the edge of the image field.

On the other hand, if the lower limit of the condition (1) is not reached, correction of the spherical aberration becomes difficult, especially at the maximum telephoto state, and coma tends to increase within the zoom range, in the case of a zoom lens with a high zoom ratio such as one of the invention, which is undesirable, although not reaching the lower limit is advantageous for enabling the diameter of the filter to be smaller and for securing an adequate brightness at the edge of the image field.

The imaging performance is further enhanced by raising the lower limit of condition (1) to no less than 0.7.

The condition (2) defines a proper range for the movement amount of the second lens unit during zooming.

If the upper limit of the condition (2) is exceeded, the movement amount of the second lens unit during zooming becomes too large, making it difficult to design the lens barrel and hindering making the zoom lens more compact.

Moreover, an increase in the movement amount of the second lens unit during zooming implies an increase in the amount of change in the zoom lens F-number, causing the F-number to increase on the telephoto side which is undesirable.

Further miniaturization is achieved by lowering the upper limit of the condition (2) to be no more than 1.8.

On the other hand, if the lower limit of the conditional equation (2) is not reached, it becomes difficult to achieve a sufficient zoom ratio, contrary to the objective of creating an inexpensive, compact zoom lens with a high zoom ratio.

Moreover, if a high zoom ratio is achieved by increasing the refractive power of the second lens unit, variations in aberrations due to zooming increase drastically. Especially, variations in spherical aberration and distortion increase drastically, which is undesirable.

The benefits of the invention are further assured by raising the lower limit of condition (2) to be no less than 1.3 or preferably no less than 1.4.

The condition (3) defines a proper range for spacing along the optical axis between the fifth lens component, that is positive, and the sixth lens component, that is negative, in the second lens unit.

In general, the structure of the second lens unit in the negative-positive two unit zoom lens is preferably of the Ernostar type and the Sonnar type. This is because positioning of the principal point of the second lens unit further toward the object side, as well as providing a large diameter opening, is possible with these types.

Moreover, if both the first lens unit and the second lens unit are made to have stronger refractive powers, it becomes advantageous to position the principal point of the second lens unit even more toward the object side. If the structure is such that the principal point of the second lens unit cannot be positioned sufficiently close to the object side, the air space between the first lens unit and the second lens group become insufficient.

There are two methods for positioning the principal point of the second lens group further toward the object side. One is to increase the spacing along the optical axis between the fifth lens component and the sixth lens component and the other is to position the principal point toward the object side by control of the shape factor of each lens.

The former method of increasing the spacing along the optical axis for properly positioning the principal point is very effective and also is advantageous for correcting spherical aberration. However, increasing the spacing along the optical axis makes precise manufacturing of the fifth lens component and the sixth lens component extremely difficult. In particular, a decline in performance due to decentering may occur.

In designing extremely easy to manufacture and inexpensive zoom lenses, it is desirable not to make the spacing along the optical axis too large. Moreover, it is desirable to assemble the fifth lens component and the sixth lens component abutting each other at the outer diameter of the lens, in the so-called method of edge contact of lens surfaces, which enhances the accuracy of spacing along the optical axis.

If the upper limit of condition (3) is exceeded, the spacing along the optical axis becomes much larger than the total length along the optical axis of the second lens unit. As a result, problems arise in manufacturing, especially achieving the required accuracy of centering becomes extremely difficult as explained above.

Furthermore, to exceed the upper limit of the condition (3) implies minimizing the total length along the optical axis of the second lens unit. Hence, in this case, in particular, correction of spherical aberration and coma on the telephoto side becomes difficult and the variations of the on-axis chromatic aberration and chromatic aberration of magnification increase sharply, which is undesirable.

Better aberration correction is achieved by lowering the upper limit of condition (3) to no more than 0.15. Moreover, the benefits of the invention are further assured by lowering the upper limit of condition (3) to be no more than 0.13.

On the other hand, if the lower limit of condition (3) is not reached, the spacing between the first lens unit and the second lens unit is not sufficiently large, which prevents achieving a higher zoom ratio. Moreover, correction of spherical aberration at the telephoto side becomes very difficult.

By raising the lower limit of condition (3) to be no less than 0.04, the correction of aberrations is further enhanced and the zoom lens can be further miniaturized with a smaller diameter, resulting in a less expensive zoom lens.

In addition to satisfying the conditions above, it is also desirable for the zoom lens of the present invention to satisfy the following condition:

$$0.05 < d23/dI < 0.5 \qquad (4)$$

where $d23$ is the spacing along the optical axis between the second meniscus lens component, that is negative, and the third lens component, that is positive, and $dI$ is the total length of the first lens unit along the optical axis.

The condition (4) defines a proper range for spacing along the optical axis between the second meniscus lens component, that is negative, and the third lens component, that is positive, in the first lens unit.

When the upper limit of condition (4) is exceeded, the zooming interval between the first lens unit and the second lens unit is reduced and the first lens unit and the second lens unit interfere with each other mechanically at the telephoto side. As a result it becomes difficult to increase the zoom ratio.

If the upper limit of condition (4) is to be no more than 0.4, a sufficient spacing between the first and second lens is achieved.

On the other hand, if the lower limit of the condition (4) is not reached, correction of aberrations, especially the coma at the wide-angle side becomes difficult and the incident height of the oblique light ray becomes high, causing a need to increase the diameter of the frontmost lens.

Moreover, it is desirable for the zoom lens of the present invention to satisfy the following condition:

$$-1 < (r2+r1)/(r2-r1) < 1 \quad (5)$$

where r1=radius of curvature of the object side lens surface of the seventh lens component, and r2=radius of curvature of the image side lens surface of the seventh lens component.

The condition (5) relates to a shape factor of the seventh lens component, that is positive, in the second lens unit. When the value of the expression of condition (5) coincides with the upper limit or the lower limit, the seventh lens component becomes, respectively, a plano-convex lens having a convex lens surface facing the object side and a plano-convex lens having a convex lens surface facing the image side.

If the upper limit of condition (5) is exceeded, the seventh lens component changes to a positive meniscus lens shape with a convex surface facing the object side. As a result, correction of the coma on the telephoto side becomes difficult.

By lowering the upper limit in condition (5) to be no more than 0.5, even better aberration correction becomes possible.

On the other hand, if the lower limit of the condition (5) is not reached, the seventh lens component changes to a positive meniscus lens shape with a convex surface facing the image side, which is advantageous for the correction of coma. However, correction of spherical aberration at the telephoto side becomes difficult if the zoom lens is a two unit zoom lens with a large zoom ratio.

By raising the lower limit in condition (5) to be no less than −0.5, even better aberration correction becomes possible.

Moreover, it is desirable for the zoom lens of the present invention to satisfy the following condition:

$$-9 < f2/fw < -1.7 \quad (6)$$

where f2=focal length of the second meniscus lens L2.

The condition (6) defines a proper range for the focal length of the second meniscus lens, that is negative, in the first lens unit.

In the case of the invention, the magnitude of negative refractive power of the first lens unit is primarily determined by the composite refractive power of the first meniscus lens and the second meniscus lens, that are both negative. Hence, the composite refractive power is nearly the same, and the magnitude of refractive power of the second negative meniscus lens relates also to the magnitude of the refractive power of the first negative meniscus lens.

If the upper limit of condition (6) is exceeded, the refractive power of the first meniscus lens, that is negative, tends to become weaker than the refractive power of the second meniscus lens, that is negative. Hence, the incident height of oblique light rays becomes higher, causing a need to increase the diameter of the frontmost lens and insufficient brightness at the edge of the image field.

On the other hand, if the lower limit of the condition (6) is not reached, the refractive power of the second meniscus lens, that is negative, becomes extremely weak and the value of forming the first lens unit of a negative lens, a negative lens and a positive lens is lost. Moreover, as explained above, an aspheric surface with shapes that are difficult to manufacture is required for aberration correction.

Moreover, it is desirable for the zoom lens of the present invention to satisfy the following condition:

$$1.69 < (n1+n2)/2 < 1.93 \quad (7)$$

where n1=refractive index of the first meniscus lens with respect to the d-line, n2=refractive index of the second meniscus lens with respect to the d-line.

The condition (7) defines an average index of refraction of the two meniscus lenses, that are negative, in the first lens unit.

However, in the case of a so-called compound type aspheric lens composed of resin material and glass material, it is preferable from a refractive power point of view, not to consider the resin material part as a separate lens component. Because the resin material part should not be considered an independent lens part, the compound type aspheric lens is not considered to be the same as a cemented lens. Rather, the resin material part should be considered part of the aspheric lens with the glass material and the refractive index of the glass material should be considered to be the refractive index of the aspheric lens.

Therefore, in the condition (7) of the invention, if a compound type aspheric surface is used, algorithms are performed based on the average refractive index as determined from the expression of condition (7) based on the refractive index of the glass lens part only of the aspheric lens.

If the upper limit of condition (7) is exceeded, the average refractive index becomes large and the curvature of each lens can be reduced (the radius of curvature can be made larger), increasing the degree of freedom in correcting aberrations. However, with current glass materials, dispersion becomes large when the refractive index is increased. Hence the elimination of color within the first lens unit becomes difficult. Moreover, from a chemical point of view, transmittance of short wavelength light tends to decline, causing the overall color balance of the lens to worsen.

On the other hand, if the lower limit of condition (7) is not reached, the curvature of each lens becomes extremely large (radius of curvature becomes small) when a small and inexpensive zoom lens with strong refractive power is used for the first lens unit as in the invention, and contributions to aberrations at each lens surface become larger, with the degree of freedom to correct the aberrations declining. As a result, correction of distortion, astigmatism and coma becomes difficult, and especially, marginal zone performance at the wide-angle side declines sharply.

By raising the lower limit of the conditional equation (7) to no less than 1.7, better aberration correction becomes possible. Moreover, by raising the lower limit of condition (7) to be no less than 1.73, or 1.75, if possible, the marginal zone performance at the wide-angle side is further improved and further miniaturization is achieved.

Moreover, it is desirable for the zoom lens of the present invention to satisfy the following condition (8):

$$1.48<(n4+n5+n7)/3<1.7 \qquad (8)$$

where n4=refractive index of the fourth lens component with respect to the d-line, n5=refractive index of the fifth lens component with respect to the d-line, n7=refractive index of the seventh lens component with respect to d-line.

The condition (8) defines the average refractive index of the fourth lens component, that is positive, the fifth lens component, that is positive, and the seventh lens component, that is positive, in the second lens unit.

If the upper limit of condition (8) is exceeded, the Petzval sum becomes smaller, making it difficult to correct distortion at the wide-angle side.

By lowering the upper limit of condition (8) to be no more than 1.67, or 1.65 if possible, better aberration correction is achieved.

On the other hand, if the lower limit of condition (8) is not reached, the radius of curvature of each lens component becomes too small. As a result, the degrees of freedom in designing the zoom lens decreases and in particular the correction of spherical aberration at the telephoto side becomes difficult.

By raising the lower limit of the condition (8) to be no less than 1.5, or 1.52 if possible, the benefits of the invention are further enhanced.

Now, the lens structure of the first lens unit of a zoom lens according to the invention will be explained.

According to the invention, the first lens unit includes, in order from the object side, a first negative meniscus lens component, a second negative meniscus lens component and a third positive lens component. In this manner, the first lens unit is basically composed of three lenses. At least one lens surface of the first negative meniscus lens component or the second negative meniscus lens component is aspheric.

By making the first negative lens component and the second negative lens component meniscus in shape, the correction of coma on the wide angle side, distortion and astigmatism becomes easier. Moreover, by using an aspheric surface, correction of coma, distortion and spherical aberration on the telephoto side is enhanced.

More precisely, the effect of an aspheric surface differs depending on the positioning of the aspheric surface. In the invention, in order to produce excellent balance between the correction of coma on the wide-angle side, astigmatism and distortion and coma on the telephoto side, an aspheric surface is introduced in at least one of two negative meniscus lens components in the first lens unit.

With the invention, in particular, an aspheric surface is designed using the conical coefficient k, as will be explained later. Hence, excellent correction of aberrations, including higher order aberrations, is made possible by controlling higher order terms with exponents up to ten that define the aspheric surface shape. As a result, the degrees of freedom for the correction of aberrations on the telephoto side increase and a favorable balance of aberrations becomes possible even if an aspheric surface is introduced relatively close to the object side of the first lens unit.

Moreover, according to the invention, due to the above-stated structure and use of an aspheric surface, the refractive power of the first lens unit may be strengthened, enabling reducing the diameters of lens components and filters. Moreover, when the first lens unit is composed of two lens components with large negative and positive refractive powers, the negative lens component is composed of two negative meniscus components. Hence, it becomes possible to make the refractive power of each negative meniscus lens component small and to make the aspheric amount of the aspheric surface small. Thus, as explained above, the structure of the first lens unit explained above is advantageous for manufacturing as well as for maintaining performance with chemical and physical changes of the zoom lens structures.

Next, a relationship between the refractive power of the first lens unit and the total length of the lens system (the distance between the surface closest to the object side in the first lens unit to the image plane) will be explained.

In general, when the zoom lens with a negative and a positive refractive power lens unit satisfies the following equation (a), $$fI=-(fw \times ft)^{1/2} \qquad (a)$$

where fI is the focal length of the first lens unit, fw is the focal length of the entire zoom lens system at the maximum wide-angle state, and ft is the focal length of the entire zoom lens system at the maximum telephoto state, the total length of the entire zoom lens system at the maximum wide-angle state becomes equal to the total length of the zoom lens system at the maximum telephoto state. Hence the change in the total length of the entire zoom lens system is a minimum.

Selecting a focal length FI of the first lens unit in such a way as to deviate drastically from the relationship of the equation (a) causes changes in the total length of the lens system to become undesirably large.

Moreover, the following equation (b) relates the focal lengths ft and fI:

$$ft=fI \times \beta t \qquad (b)$$

where $\beta t$ denotes a magnification of the second lens unit, which is a positive lens unit, at the maximum telephoto state.

In order to make a zoom lens compact, it is advantageous for the second lens unit to have a magnification exceeding one at the maximum telephoto state. Moreover, each lens unit needs to have strong refractive power in order to satisfy the equations (a) and (b) above with a compact zoom lens performing satisfactory correction of aberrations. Hence, in the case of a conventional zoom lens, there has been a tendency to include a large number of lenses in each lens unit. As a result, the length of each lens unit tends to increase which hinders achieving a compact system.

However, unlike the conventional technology, in the zoom lens of the invention, the first lens unit includes a first negative lens component, a second negative lens component and a positive lens component, and the refractive powers are chosen to achieve miniaturization in accordance with the conditions of equations (a) and (b) above.

Moreover, along with allowing the filter size to be small and increasing the brightness at the edge of the image field, the focal length fI of the first lens unit in equation (a) is chosen to be relatively smaller than the conventional technology so that the movement amount of the first lens unit during focusing is minimized.

In this manner, the invention is able to provide an inexpensive and compact standard zoom lens capable of using small filters but with sufficient amount of light in the marginal zone and with small focusing movement amounts of the lens units during focusing.

BRIEF DESCRIPTION OF THE DRAWINGS

The invention will be described in conjunction with the following drawings in which like reference numerals designate like elements, and wherein.

DETAILED DESCRIPTION OF PREFERRED EMBODIMENTS

A zoom lens in each embodiment of the present invention includes, in order from the object side, a first lens unit G1 of overall negative refractive power and a second lens unit G2 of overall positive refractive power, wherein zooming is performed by changing the spacing between the first lens unit G1 and the second lens unit G2, with the first lens unit G1 including, in order from the object side, a first negative meniscus lens component L1 having a concave surface with a stronger curvature facing the image side, a second negative meniscus lens component L2 having a concave surface with the stronger curvature facing the image side, and a third positive lens component L3, and with the second lens unit G2 including, in order from the object side, a fourth positive lens component L4, a fifth positive lens component L5, a sixth negative lens component L6, and a seventh positive lens component L7.

Figures 1A, 1B:
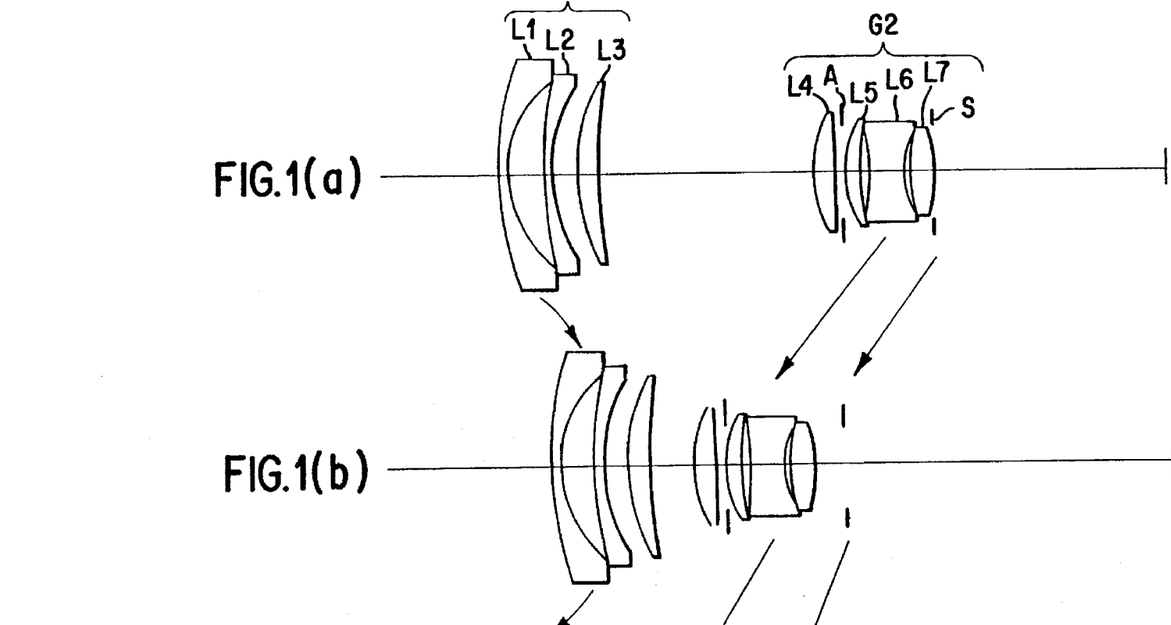
FIGS. 1(a)–1(c) are cross-sectional views of a zoom lens according to a first embodiment of the invention at a maximum wide angle state (W), a medium focal length state (M) and a maximum telephoto state (T) respectively.
Figure 1C:
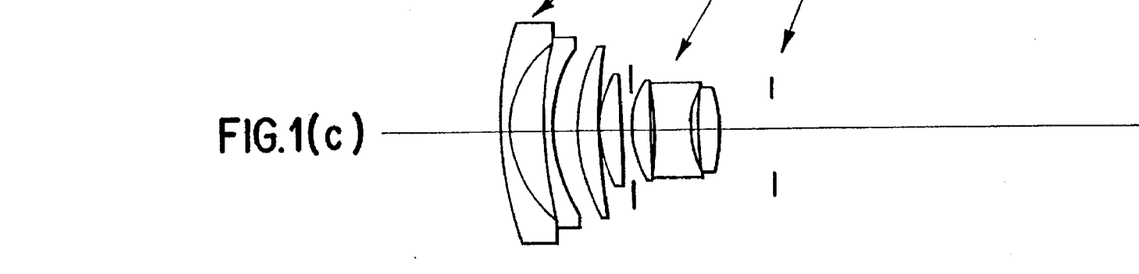
Figure 2A:
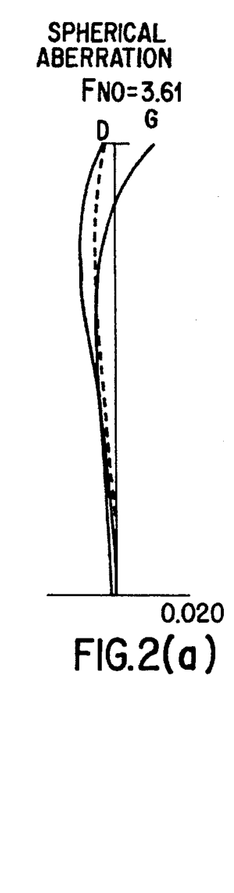
FIGS. 2(a)–2(e) are graphs of various aberrations at a maximum wide-angle state in the first embodiment of the invention.
Figure 2B:
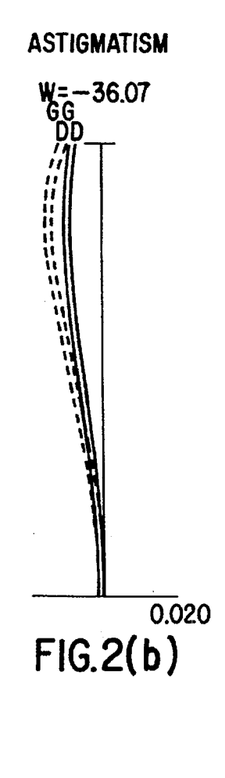
Figure 2C:
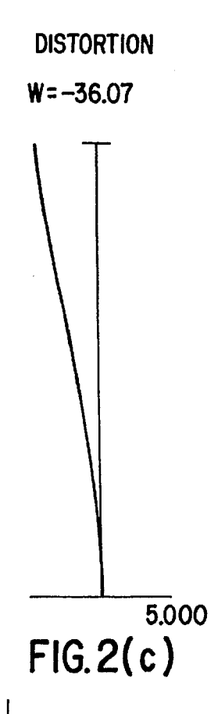
Figure 2D:
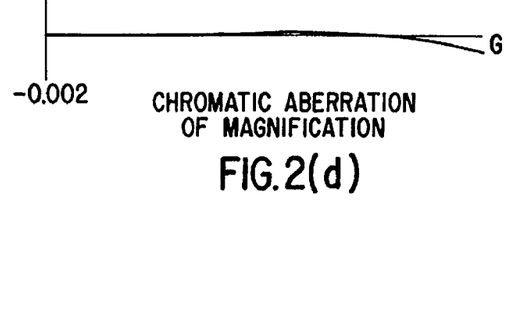
Figure 2E:
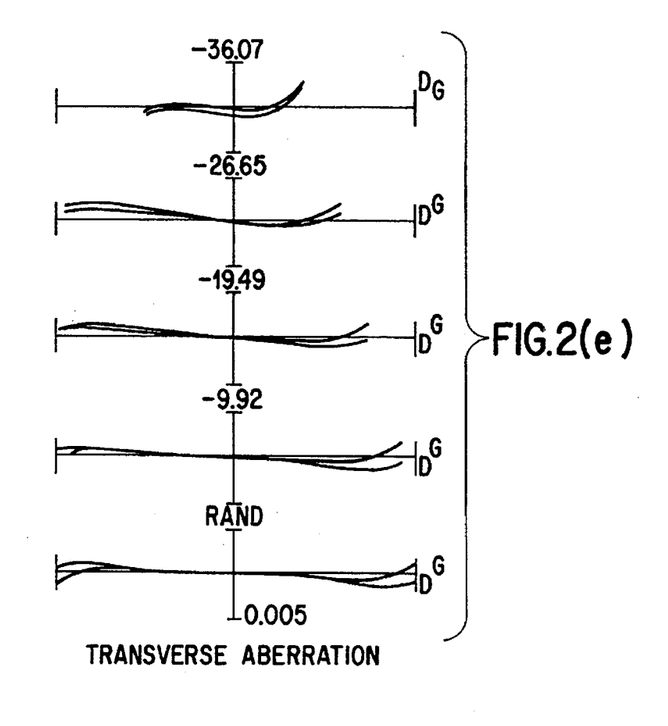
Figure 3A:
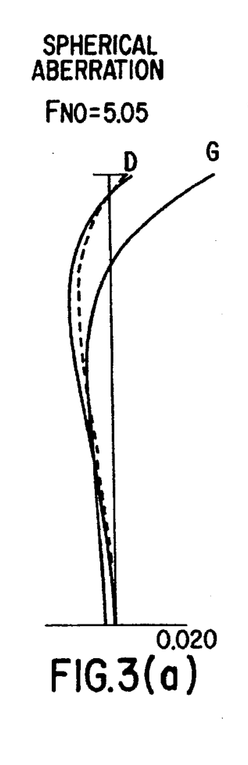
FIGS. 3(a)–3(e) are graphs of various aberrations at an intermediate focal length state in the first embodiment of the invention.
Figure 3B:
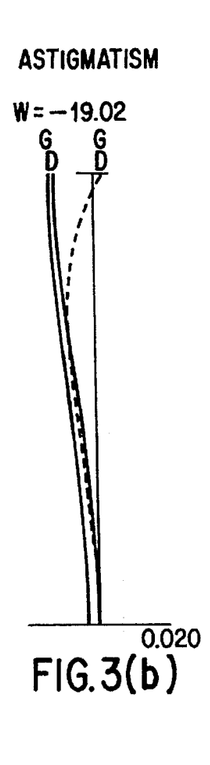
Figure 3C:
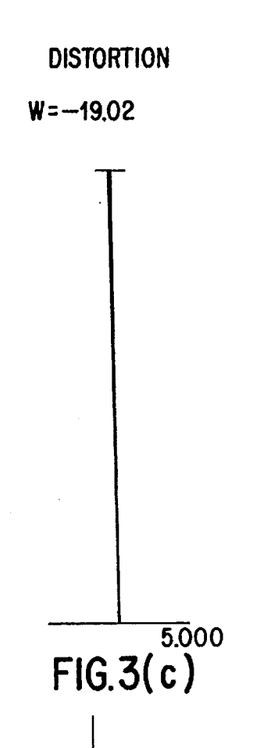
Figure 3D:
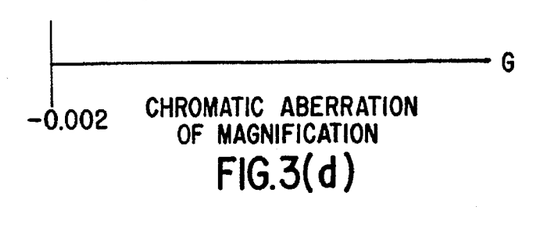
Figure 3E:
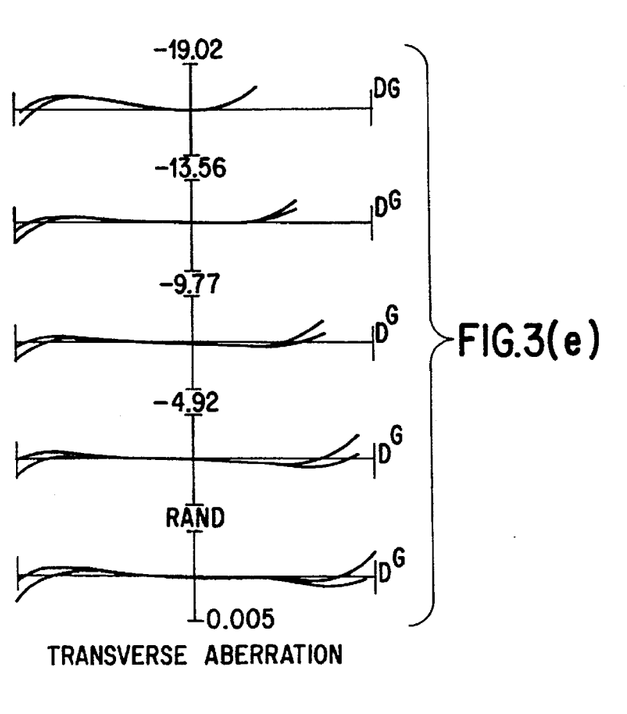
Figure 4A:
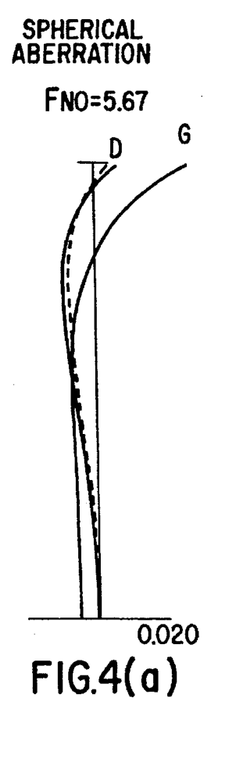
FIGS. 4(a)–4(e) are graphs of various aberrations at a maximum telephoto state in the first embodiment.
Figure 4B:
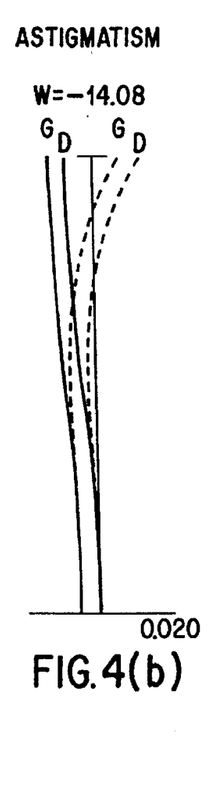
Figure 4C:
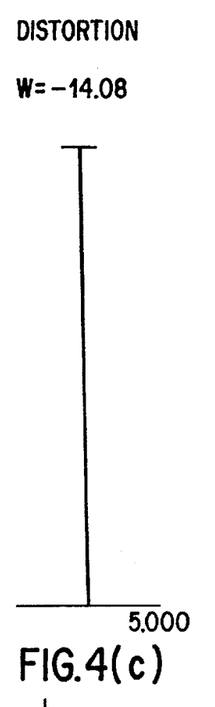
Figure 4D:
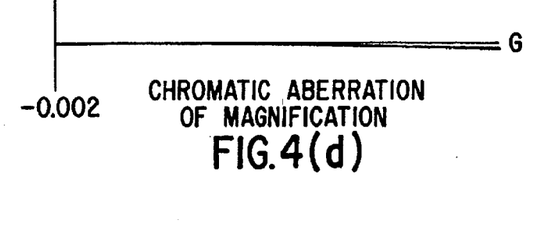
Figure 4E:
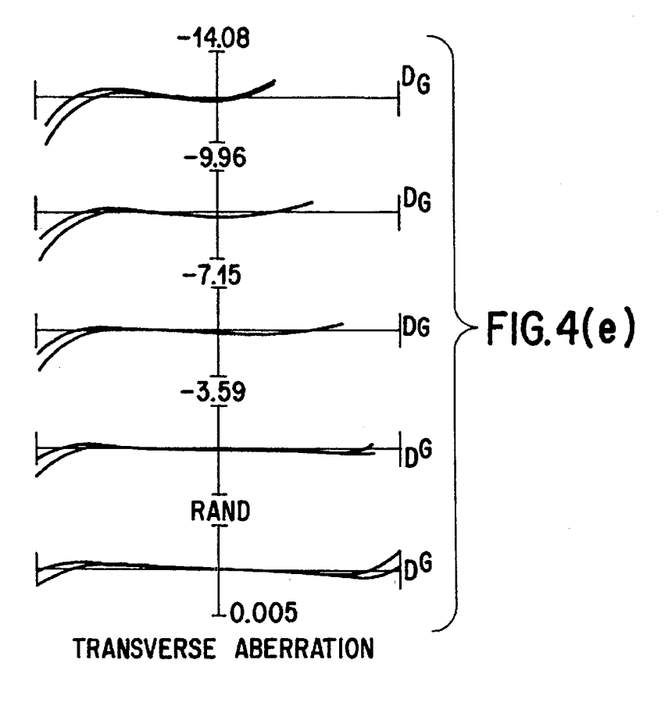

FIGS. 1(a)–1(c) shows the lens structure of a zoom lens and the movement of each lens unit during zooming in the first embodiment of the present invention. In FIGS. 1(a)–1(c), W denotes a maximum wide-angle state, M denotes an intermediate focal length state and T denotes a maximum telephoto state.

The zoom lens in FIGS. 1(a)–1(c) includes, in order from the object side, a first lens unit G1 including a first negative meniscus lens L1 with a concave surface facing the image side, a second negative meniscus lens L2 with a concave surface facing the image side and a positive meniscus lens L3 with a convex surface facing the object side, and a second lens unit G2 including a bi-convex lens L4, a positive meniscus lens L5 with convex surface facing the object side, bi-concave lens L6 and bi-convex lens L7.

Here, a flare stop S is placed in the back (image side) of the second lens unit G2 to shield the off-axis marginal light rays which produce large coma. The flare stop S moves on the optical axis independently of the second lens unit G2 during zooming, as shown in FIG. 1, and effectively shields coma flare.

An aperture stop A is provided between the bi-convex lens L4 and the positive meniscus lens L5. The aperture stop A moves with the second lens unit G2 as one unit during zooming, as shown in FIG. 1.

Additionally, the second negative meniscus lens L2 in the first lens unit G1 is a compound type aspheric lens made of resin material and glass material with its object side surface aspheric.

The values of various dimensions of the first embodiment of the invention are listed in Table 1 below. In Table 1, f denotes the focal length of the zoom lens, FNO denotes the F-number, and $2\omega$ denotes the field angle. Moreover, the surface number indicates the order of the lens surfaces from the object side, and the refractive indices and Abbe numbers are the values corresponding to a d-line ($\lambda$=587.6 nm).

The shape of the aspheric surfaces is expressed by the following equation (c) where y denotes the height in the direction perpendicular to the optical axis, S(y) denotes the amount of displacement in the direction of the optical axis at height y, R denotes a reference radius of curvature, k denotes a conical coefficient, and $C_n$ denotes an aspheric surface coefficient of nth degree.

$$S(y)=(y^2/R)/[1+(1-k \cdot y^2/R^2)^{1/2}]+C_2 \cdot y^2+C_4 \cdot y^4+C_6 \cdot y^6+ C_8 \cdot y^8+C_{10} \cdot y^{10}+ \ldots \tag{c}$$

Furthermore, the paraxial radius of curvature of each aspheric surface is defined by the equation (d) below.

$$r=1/(2 \cdot C_2+1/R) \tag{d}$$

Aspheric surfaces are indicated in the tables that follow by the symbol * to the right of the surface number.

First Embodiment f=1.0–2.7733

FNO=3.61–5.67

$2\omega$=72.1°–28.1°

TABLE 1

| Surface Number | Radius of Curvature | Separation of Lens Surfaces | Abbe Number | Refractive Index |
| --- | --- | --- | --- | --- |
| 1 | 2.3395 | 0.0648 | 40.9 | 1.79631 |
| 2 | 0.8014 | 0.2227 | | |
| 3* | 3.7240 | 0.0012 | 56.3 | 1.49521 |
| 4 | 2.4357 | 0.0648 | 49.5 | 1.77279 |
| 5 | 1.0595 | 0.1680 | | |
| 6 | 1.1807 | 0.1457 | 25.5 | 1.80458 |
| 7 | 3.3328 | (d7 variable) | | |
| 8 | 0.8342 | 0.1457 | 61.1 | 1.58913 |
| 9 | −11.7341 | 0.0648 | | |
| 10 | ∞ | 0.0162 | (aperture –stop A) | |
| 11 | 0.7653 | 0.1134 | 58.9 | 1.51823 |
| 12 | 3.4769 | 0.0405 | | |
| 13 | −2.7268 | 0.2389 | 28.6 | 1.79504 |
| 14 | 0.6045 | 0.0445 | | |
| 15 | 1.3878 | 0.1498 | 38.0 | 1.60342 |

TABLE 1-continued

| | | | |
|---|---|---|---|
| 16 | −1.3877 | (d16 variable) | |
| 17 | ∞ | (d17 variable) | (flare stop S) |

Aspheric surface data $K = 0$

| Aspheric Coefficient | Surface 3 |
|---|---|
| $C_2$ | 0.0000 |
| $C_4$ | $1.09922 \times 10^{-1}$ |
| $C_6$ | $8.42904 \times 10^{-2}$ |
| $C_8$ | $1.15588 \times 10^{-1}$ |
| $C_{10}$ | $1.53070 \times 10^{-1}$ |

Separation of lens surfaces with zooming

| f | 1.0000 | 2.0243 | 2.7733 |
|---|---|---|---|
| d7 | 1.4747 | 0.3334 | 0.0325 |
| d16 | 0.000 | 0.2148 | 0.3719 |
| d17 | 1.5695 | 2.2140 | 2.6852 |

Values corresponding to conditions

| Condition | Condition Satisfying Data |
|---|---|
| (1) | $|fIII|/(fw \times ft)^{1/2} = 0.985$ |
| (2) | $XIII/fw = 1.49$ |
| (3) | $d56/dIII = 0.0498$ |
| (4) | $d23/dI = 0.252$ |
| (5) | $(r2 + r1)/(r2 - r1) = 0$ |
| (6) | $f2/fw = -2.11$ |
| (7) | $(n1 + n2)/2 = 1.785$ |
| (8) | $(n4 + n5 + n7)/3 = 1.570$ |

FIG. 2(a) through FIG. 4(e) show various aberration graphs of the first embodiment. FIG. 2(a)–2(e) show various aberration graphs for the maximum wide-angle state (shortest focal length state). FIGS. 3(a)–3(e) show various aberration graphs for an intermediate focal length state, and FIGS. 4(a)–4(e) show various aberration graphs for the maximum telephoto state (longest focal length state).

In each aberration graph, FNO denotes the F-number, ω denotes one half of the field angle (2ω), D denotes the d-line (λ=587.6 nm) and G denotes the g-line (λ=435.8 nm), respectively. Moreover, in the aberration graphs describing astigmatism, the solid line represents the sagittal image plane while the dotted line represents the meridional image plane.

Furthermore, in the aberration graphs showing spherical aberration, the dotted line represents the sine condition.

The aberration graphs show that the various aberrations are favorably corrected at each focal length in the first embodiment.

Figure 5A:
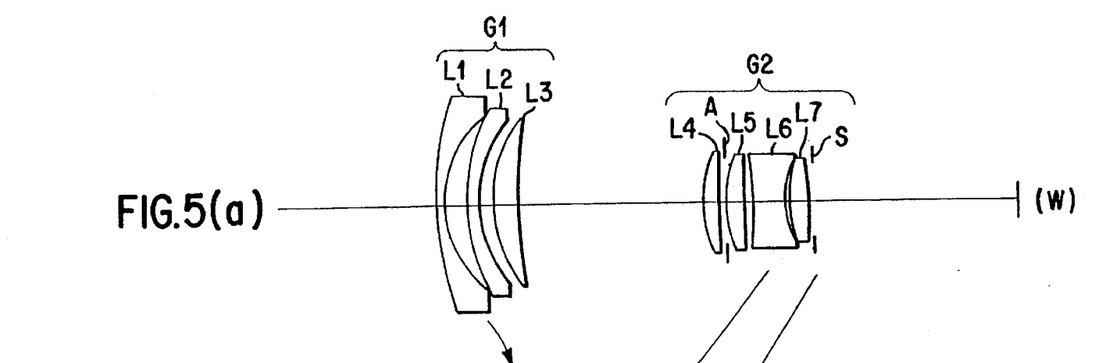
FIGS. 5(a)–5(c) are cross-sectional views of a zoom lens according to a second embodiment of the invention at a maximum wide angle state (W), a medium focal length state (M) and a maximum telephoto state (T) respectively.
Figure 5B:
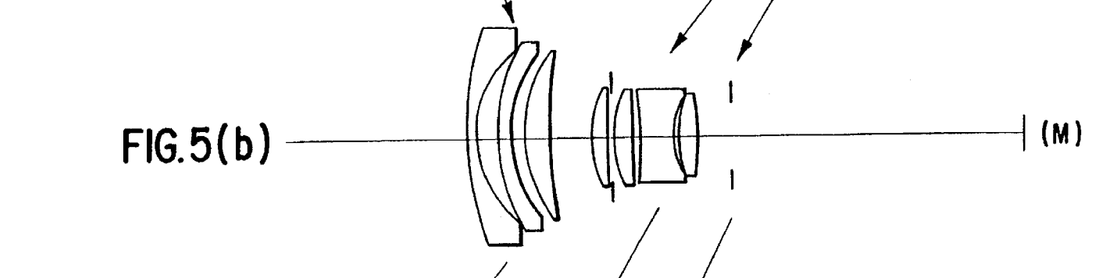
Figure 5C:
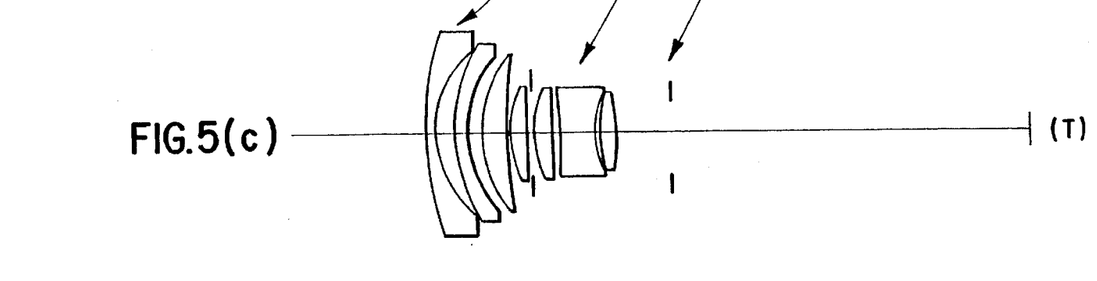
Figure 6A:
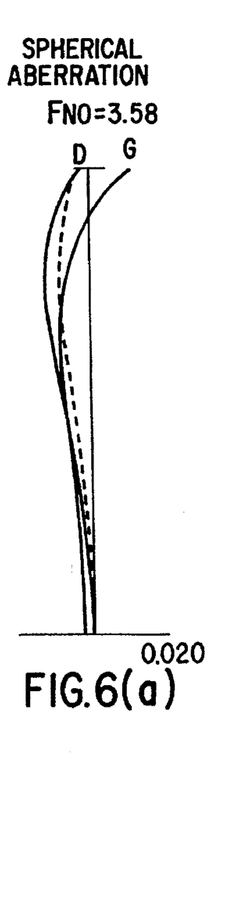
FIGS. 6(a)–6(e) are graphs of various aberrations at a maximum wide-angle state in the second embodiment.
Figure 6B:
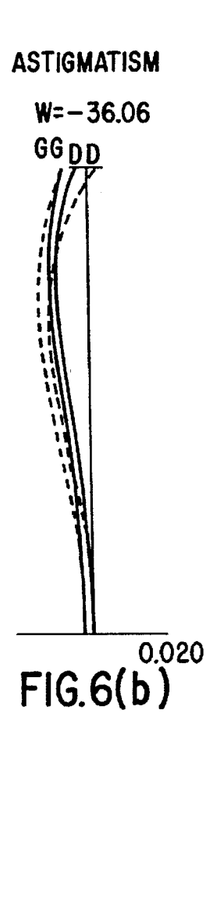
Figure 6C:
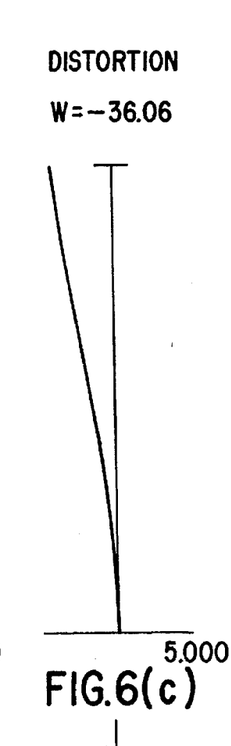
Figure 6D:
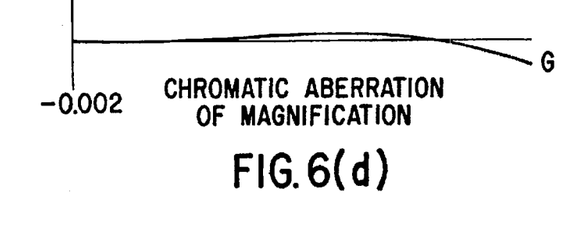
Figure 6E:
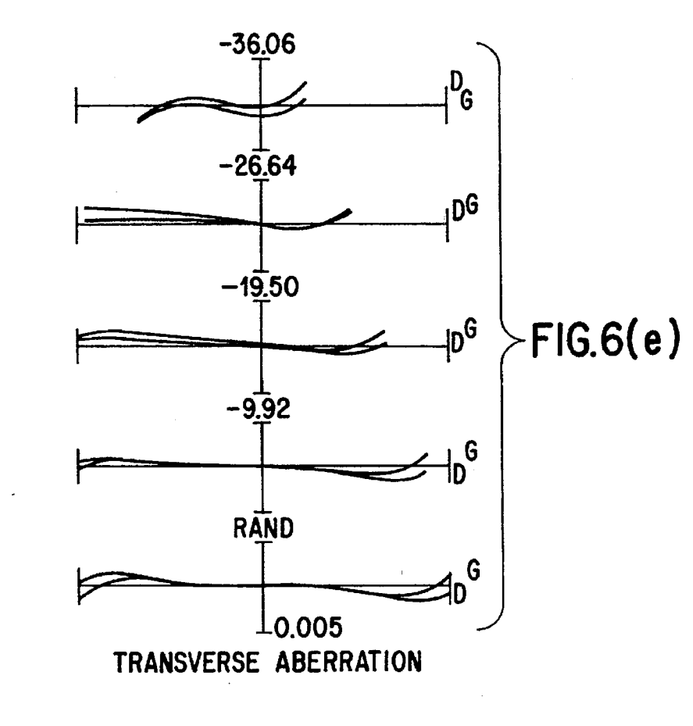
Figure 7A:
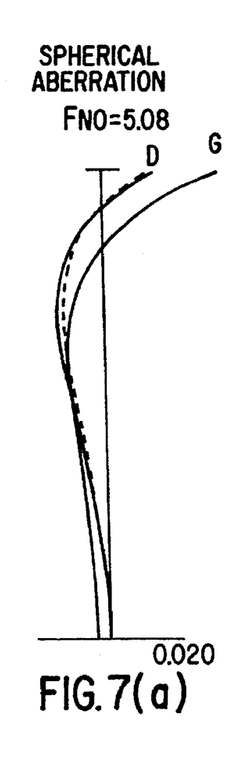
FIGS. 7(a)–7(e) are graphs of various aberrations at an intermediate focal length state in the second embodiment.
Figure 7B:
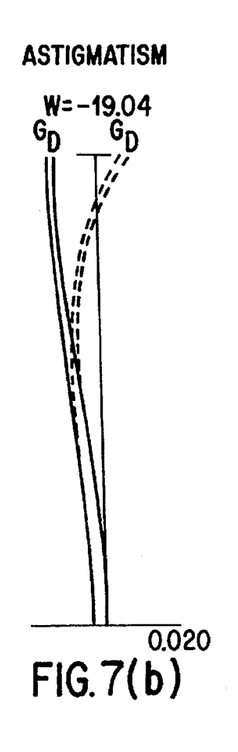
Figure 7C:
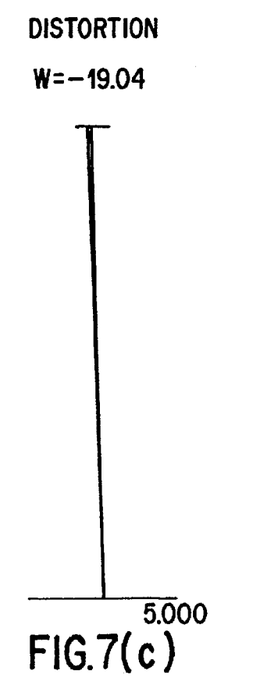
Figure 7D:
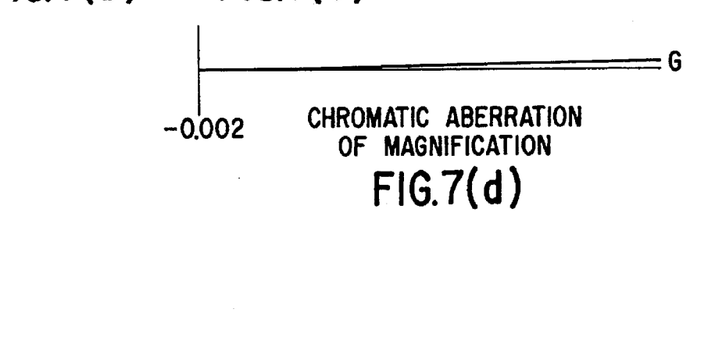
Figure 7E:
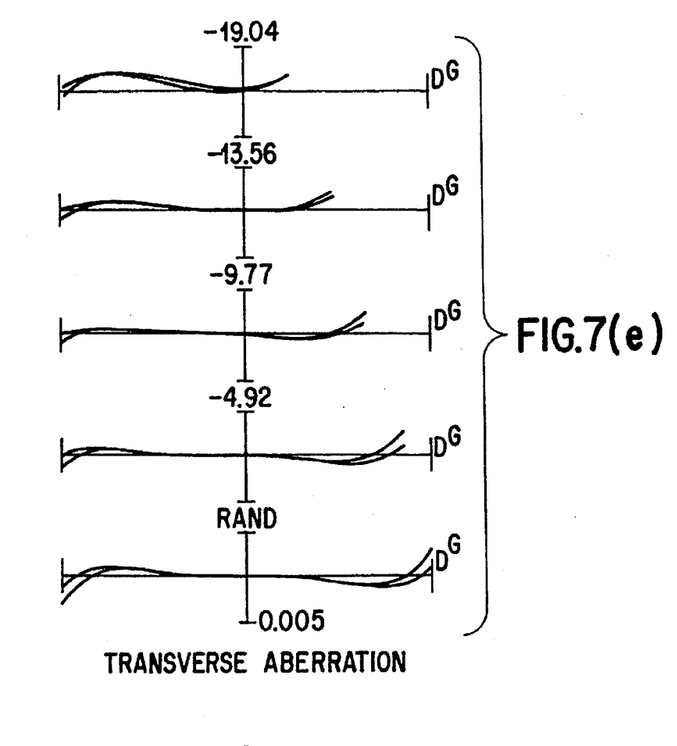
Figure 8A:
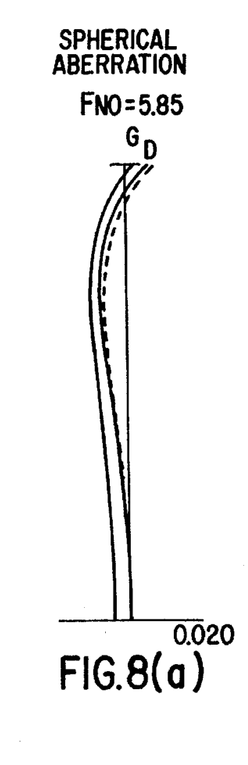
FIGS. 8(a)–8(e) are graphs of various aberrations at a maximum telephoto state in the second embodiment.
Figure 8B:
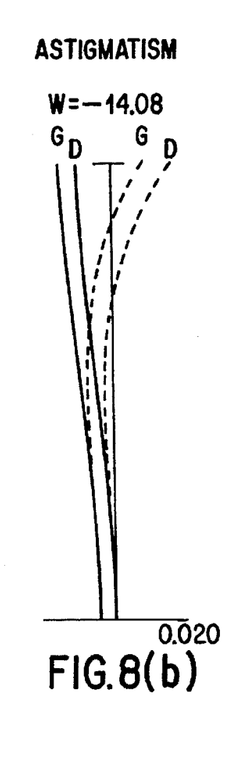
Figure 8C:
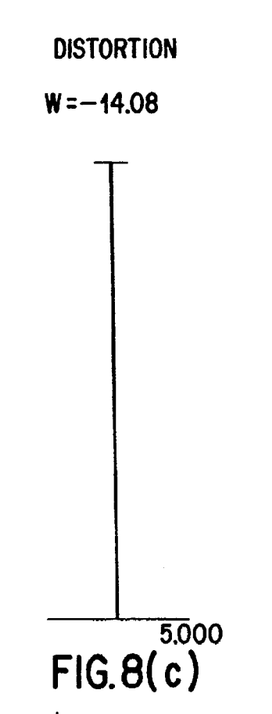
Figure 8D:
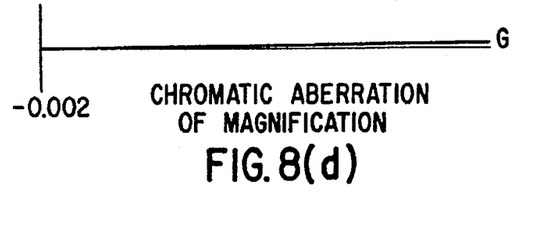
Figure 8E:
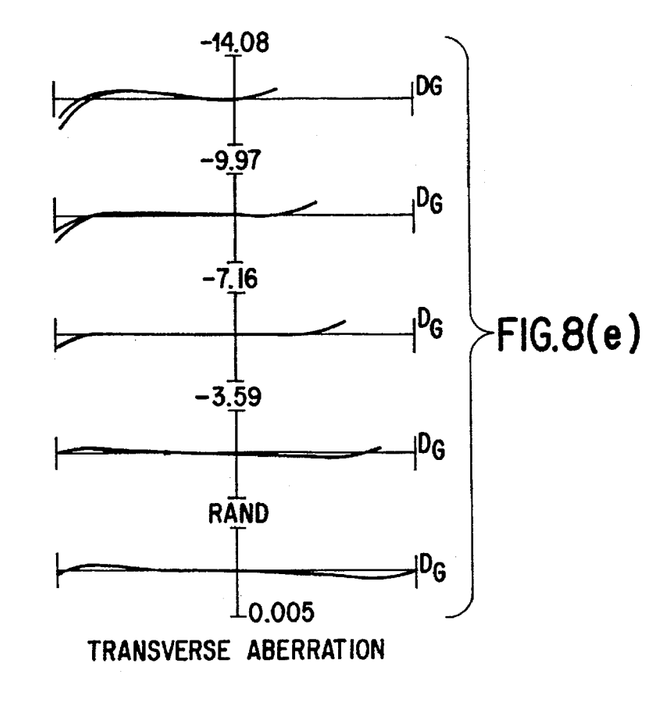

FIGS. 5(a)–5(c) shows the lens structure of a zoom lens and the movement of each lens unit during zooming in a second embodiment of the present invention. In FIGS. 5(a)–5(c), W denotes a maximum wide-angle state, M denotes an intermediate focal length state and T denotes a maximum telephoto state.

The zoom lens in FIGS. 5(a)–5(c) includes, in order from the object side, a first lens unit G1 including a first negative meniscus lens L1 with a concave surface facing the image side, a second negative meniscus lens L2 with a concave surface facing the image side and a positive meniscus lens L3 with a convex surface facing the object side, and the second lens unit G2 including a positive meniscus lens L4 with a convex surface facing object side, a positive meniscus lens L5 with a convex surface facing object side, bi-concave lens L6 and bi-convex lens L7.

A flare stop S is placed in the back (image side) of the second lens unit G2 to shield off-axis marginal light rays which produce large coma. The flare stop S moves on the optical axis independently of the second lens unit G2 during zooming, as shown in FIGS. 1(a)–1(c), and shields coma flare.

An aperture stop A is provided between the positive meniscus lens L4 and the positive meniscus lens L5. The aperture stop A moves with the second lens unit G2 as one unit during zooming, as shown in FIGS. 1(a)–1(c).

Additionally, the second negative meniscus lens L2 in the first lens unit G1 has an object side lens surface of aspheric shape.

The values of various dimensions of the second embodiment of the invention are listed in Table 2 below. In Table 2, f denotes the focal length of the zoom lens, FNO denotes the F-number, and 2ω denotes the field angle. Moreover, the surface number indicates the order of the lens surfaces from the object side, and the refractive indices and Abbe numbers are the values corresponding to the d-line (λ=587.6 nm).

Second Embodiment f=1.0–2.7733
FNO—3.58–5.85
2ω=72.1°–28.1°

TABLE 2

| Surface Number | Radius of Curvature | Separation of Lens Surfaces | Abbe Number | Refractive Index |
|---|---|---|---|---|
| 1 | 2.6074 | 0.0648 | 39.8 | 1.86994 |
| 2 | 0.7646 | 0.1619 | | |
| 3* | 1.7260 | 0.0648 | 49.5 | 1.77279 |
| 4 | 0.6736 | 0.1307 | | |
| 5 | 1.0055 | 0.1619 | 25.5 | 1.80458 |
| 6 | 2.7768 | (d6 variable) | | |
| 7 | 0.8195 | 0.1215 | 61.1 | 1.58913 |
| 8 | 3.9093 | 0.0405 | | |
| 9 | ∞ | 0.0081 | (aperture –stop A) | |
| 10 | 0.7632 | 0.1336 | 58.5 | 1.61272 |
| 11 | 9.4610 | 0.0567 | | |
| 12 | −3.2276 | 0.2389 | 28.6 | 1.79504 |
| 13 | 0.5282 | 0.0445 | | |
| 14 | 0.9144 | 0.1215 | 38.0 | 1.60342 |
| 15 | −1.6342 | (d15 variable) | | |
| 16 | ∞ | (d16 variable) | (flare stop S) | | aspheric surface data $K = 0$

| Aspheric Coefficient | Surface 3 |
|---|---|
| $C_2$ | 0.00000 |
| $C_4$ | $1.31410 \times 10^{-1}$ |
| $C_6$ | $3.00190 \times 10^{-1}$ |
| $C_8$ | $-5.49530 \times 10^{-1}$ |
| $C_{10}$ | 1.40010 |

Separation of lens surfaces with zooming

| f | 1.0000 | 2.0243 | 2.7733 |
|---|---|---|---|
| d6 | 1.3404 | 0.3054 | 0.0325 |
| d15 | 0.0511 | 0.2612 | 0.4149 |
| d16 | 1.4712 | 2.1015 | 2.5625 |

Values corresponding to conditions

| Condition | Condition Satisfying Data |
|---|---|
| (1) | $|fI|/(fw \times ft)^{1/2} = 0.948$ |
| (2) | $XII/fw = 1.46$ |
| (3) | $d56/dII = 0.0741$ |
| (4) | $d23/dI = 0.224$ |
| (5) | $(r2 + r1)/(r2 - r1) = 0.282$ |
| (6) | $f2/fw = -2.37$ |
| (7) | $(n1 + n2)/2 = 1.821$ |
| (8) | $(n4 + n5 + n7)/3 = 1.602$ |

FIG. 6(a) through FIG. 8(e) show various aberration graphs of the second embodiment with FIGS. 6(a)–6(e) showing various aberration graphs for the maximum wide-angle state (shortest focal length state). FIGS. 7(a)–7(e) show various aberration graphs for an intermediate focal length state, and FIGS. 8(a)–8(e) show various aberration graphs for the maximum telephoto state (longest focal length state).

In each aberration graph, FNO denotes F-number, ω denotes one half of the field angle (2ω), D denotes the d-line (λ=587.6 nm) and G denotes g-line (λ=435.8 nm), respectively. Moreover, in the aberration graphs describing astigmatism, the solid line represents the sagittal image plane while the dotted line represents the meridional image plane. Furthermore, in the aberration graphs describing spherical aberration, the dotted line represents the sine condition.

The aberration graphs show that various aberrations are favorably corrected at each focal length condition in the second embodiment.

In each of the embodiments above, an aspheric surface is used for the object side lens surface of the second negative meniscus lens L2, but an aspheric lens surface can be used in the first negative meniscus lens L1 or in both the first negative meniscus lens L1 and the second negative meniscus lens L2. Alternatively, an aspheric lens surface can be used in the positive lens L3 in the first lens unit G1 or in a lens in the second lens unit G2 in addition to the first negative meniscus lens L1 and the second negative meniscus lens L2.

Furthermore, in each of the embodiments above, an aperture stop A is provided between the positive lens L4 and the positive lens L5 in the second lens unit G2, but the aperture stop can be placed between the first lens unit G1 and the second lens unit G2 or behind the second lens unit G2.

Moreover, in each of the embodiments above, a flare stop S is provided toward the back of the second lens group G2 in order to reduce coma. Also, the upper flare stop S is given a different locus of motion from the second lens unit G2 but the flare stop S can be given any locus of motion as long as coma is reduced by shielding by the flare stop.

Moreover, even if a third lens unit G3 with weak refraction power is provided in the invention, essentially the same structure operates as disclosed in the first and second embodiments of the invention. The same beneficial effects can be achieved with this modification.

As explained above, the invention provides an inexpensive, compact standard zoom lens composed of small number of lenses having excellent imaging performance with zooming ratio of about 2.7 and a field angle at a maximum wide-angle state of about 72°.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A zoom lens, comprising in order from an object side along an optical axis:

a first lens unit having negative refractive power, the first lens unit including, in order from the object side, a first negative meniscus lens component having a concave lens surface facing an image side, a second negative meniscus lens component having a concave lens surface facing the image side, and a third lens component that is positive and has a convex lens surface facing the object side; and a second lens unit having positive refractive power, the second lens unit including, in order from the object side, fourth and fifth lens components that are each positive, a sixth lens component that is negative, and a seventh lens component that is positive, wherein zooming is performed by changing the spacing along the optical axis between said first lens unit and said second lens unit, and wherein at least one of the lens surfaces of said first meniscus lens component or of said second meniscus lens component is aspheric and satisfies the following conditions:

$$0.6 \leq |fI|/(fw \times ft)^{1/2} < 1.0$$

$$1.2 \leq XII/fw \leq 2.0$$

$$0.02 \leq d56/dII \leq 0.18$$

where fI=focal length of said first lens unit, fw=focal length of the entire zoom lens at a maximum wide-angle state, ft=focal length of the entire zoom lens at a maximum telephoto state, and XII=maximum movement amount of said second lens unit along the optical axis during zooming, d56=spacing between said fifth and sixth lens component along the optical axis, and dII=total length of said second lens unit along the optical axis.

2. The zoom lens of claim 1, wherein the following condition is satisfied:

$$0.05 < d23/dI < 0.5$$

where d23=spacing between said second meniscus lens component and said third lens component along the optical axis, and dI=total length of said first lens unit along the optical axis.

3. The zoom lens of claim 2, wherein the following condition is satisfied:

$$-1 < (r2+r1)/(r2-r1) < 1$$

where
- r1=radius of curvature of an object side lens surface of said seventh lens component, and
- r2=radius of curvature of an image side lens surface of said seventh lens component.

4. The zoom lens of claim 3, wherein the following condition is satisfied:

$$-9 < f2/fw < -1.7$$

where
- f2=focal length of said second meniscus lens component, and
- fw=focal length of the entire zoom lens at a maximum wide-angle state.

5. The zoom lens of claim 4, wherein the following condition is satisfied:

$$1.69 < (n1+n2)/2 < 1.93$$

where
- n1=refractive index of said first meniscus lens component with respect to the d-line, and
- n2=refractive index of said second meniscus lens component with respect to the d-line.

6. The zoom lens of claim 3, wherein the following condition is satisfied:

$$1.69 < (n1+n2)/2 < 1.93$$

where
- n1=refractive index of said first meniscus lens component with respect to the d-line, and
- n2=refractive index of said second meniscus lens component with respect to the d-line.

7. The zoom lens of claim 3, wherein the following condition is satisfied:

$$1.48 < (n4+n5+n7)/3 < 1.7$$

where
- n4=refractive index of said fourth lens component with respect to the d-line,
- n5=refractive index of said fifth lens component with respect to the d-line, and
- n7=refractive index of said seventh lens component with respect to the d-line.

8. The zoom lens of claim 2, wherein the following condition is satisfied:

$$-9 < f2/fw < -1.7$$

where
- f2=focal length of said second meniscus lens component, and
- fw=focal length of the entire zoom lens at a maximum wide-angle state.

9. The zoom lens of claim 2, wherein the following condition is satisfied:

$$1.69 < (n1+n2)/2 < 1.93$$

where
- n1=refractive index of said first meniscus lens component with respect to the d-line, and
- n2=refractive index of said second meniscus lens component with respect to the d-line.

10. The zoom lens of claim 2, wherein the following condition is satisfied:

$$1.48 < (n4+n5+n7)/3 < 1.7$$

where
- n4=refractive index of said fourth lens component with respect to the d-line,
- n5=refractive index of said fifth lens component with respect to the d-line, and
- n7=refractive index of said seventh lens component with respect to the d-line.

11. The zoom lens of claim 1, wherein the following condition is satisfied:

$$-1 < (r2+r1)/(r2-r1) < 1$$

where
- r1=radius of curvature of an object side lens surface of said seventh lens component, and
- r2=radius of curvature of an image side lens surface of said seventh lens component.

12. The zoom lens of claim 11, wherein the following condition is satisfied:

$$-9 < f2/fw < -1.7$$

where
- f2=focal length of said second meniscus lens component, and
- fw=focal length of the entire zoom lens at a maximum wide-angle state.

13. The zoom lens of claim 11, wherein the following condition is satisfied:

$$1.69 < (n1+n2)/2 < 1.93$$

where
- n1=refractive index of said first meniscus lens component with respect to the d-line, and
- n2=refractive index of said second meniscus lens component with respect to the d-line.

14. The zoom lens of claim 11, wherein the following condition is satisfied:

$$1.48 < (n4+n5+n7)/3 < 1.7$$

where
- n4=refractive index of said fourth lens component with respect to the d-line,
- n5=refractive index of said fifth lens component with respect to the d-line, and
- n7=refractive index of said seventh lens component with respect to the d-line.

15. The zoom lens of claim 1, wherein the following condition is satisfied:

$$-9 < f2/fw < -1.7$$

where
- f2=focal length of said second meniscus lens component, and
- fw=focal length of the entire zoom lens at a maximum wide-angle state.

16. The zoom lens of claim 15, wherein the following condition is satisfied:

$$1.69 < (n1+n2)/2 < 1.93$$

where

- n1=refractive index of said first meniscus lens component with respect to the d-line, and
- n2=refractive index of said second meniscus lens component with respect to the d-line.

17. The zoom lens of claim 15, wherein the following condition is satisfied:

$$1.48 < (n4+n5+n7)/3 < 1.7$$

where

- n4=refractive index of said fourth lens component with respect to the d-line,
- n5=refractive index of said fifth lens component with respect to the d-line, and
- n7=refractive index of said seventh lens component with respect to the d-line.

18. The zoom lens of claim 1, wherein the following condition is satisfied:

$$1.69 < (n1+n2)/2 < 1.93$$

where

- n1=refractive index of said first meniscus lens component with respect to the d-line, and
- n2=refractive index of said second meniscus lens component with respect to the d-line.

19. The zoom lens of claim 18, wherein the following condition is satisfied:

$$1.48 < (n4+n5+n7)/3 < 1.7$$

where

- n4=refractive index of said fourth lens component with respect to the d-line,
- n5=refractive index of said fifth lens component with respect to the d-line, and
- n7=refractive index of said seventh lens component with respect to the d-line.

20. The zoom lens of claim 1, wherein the following condition is satisfied:

$$1.48 < (n4+n5+n7)/3 < 1.7$$

where

- n4=refractive index of said fourth lens component with respect to the d-line,
- n5=refractive index of said fifth lens component with respect to the d-line, and
- n7=refractive index of said seventh lens component with respect to the d-line.

* * * * *